United States Patent
Jalkanen et al.

(10) Patent No.: US 9,525,708 B2
(45) Date of Patent: Dec. 20, 2016

(54) CONVERSION SYSTEM AND METHOD IN MULTIOPERATOR ENVIRONMENT

(75) Inventors: Tero Jalkanen, Tuusula (FI); Jari Weckman, Lampäälä (FI)

(73) Assignee: TELIASONERA AB, Stockholm (SE)

( * ) Notice: Subject to any disclaimer, the term of this patent is extended or adjusted under 35 U.S.C. 154(b) by 1249 days.

(21) Appl. No.: 12/673,330

(22) PCT Filed: Aug. 12, 2008

(86) PCT No.: PCT/FI2008/050456
§ 371 (c)(1),
(2), (4) Date: Feb. 12, 2010

(87) PCT Pub. No.: WO2009/022056
PCT Pub. Date: Feb. 19, 2009

(65) Prior Publication Data
US 2011/0255529 A1    Oct. 20, 2011

(30) Foreign Application Priority Data

Aug. 16, 2007    (FI) ..................................... 20075575

(51) Int. Cl.
*H04L 29/06* (2006.01)
*H04M 7/12* (2006.01)
*H04Q 3/00* (2006.01)

(52) U.S. Cl.
CPC ............. *H04L 65/103* (2013.01); *H04L 69/08* (2013.01); *H04M 7/1225* (2013.01); *H04Q 3/0025* (2013.01); *H04Q 3/0045* (2013.01)

(58) Field of Classification Search
CPC .. H04L 65/1006; H04L 65/104; H04L 65/103; H04L 69/08; H04M 7/0003; H04M 7/1225; H04Q 3/0025; H04Q 3/0045
(Continued)

(56) References Cited

U.S. PATENT DOCUMENTS 6,026,086 A * 2/2000 Lancelot ............. H04L 12/2801
370/353
6,442,169 B1 * 8/2002 Lewis ................. H04L 12/2856
370/352
(Continued)

FOREIGN PATENT DOCUMENTS

EP        1259037        11/2002
EP        1 758 333 A1    2/2007
(Continued)

OTHER PUBLICATIONS

GSM Association: "IPX White Paper", Mar. 22, 2007, XP002598701, London, U.K., Retrieved from the Internet: URL:http://gsmworld.com/documents/ipx_wp12.pdf.
(Continued)

*Primary Examiner* — Khaled Kassim
(74) *Attorney, Agent, or Firm* — Cozen O'Connor

(57) ABSTRACT

The invention relates to a method of performing signalling and media conversion in a multioperator environment. The invention comprises receiving a signalling from a first operator; detecting a second operator of the signalling; checking information of the second operator from a database; carrying out at least one conversion to the signalling from the first operator; and transmitting the signalling to the second operator.

6 Claims, 2 Drawing Sheets

(58) Field of Classification Search
USPC .......................... 370/352, 260, 401; 455/445
See application file for complete search history.

(56) References Cited

U.S. PATENT DOCUMENTS

| | | | | |
|---|---|---|---|---|
| 6,667,974 | B1* | 12/2003 | Shigeta | H04L 12/4625 370/389 |
| 7,346,076 | B1 | 3/2008 | Habiby et al. | |
| 7,593,388 | B1* | 9/2009 | Mitchell | H04L 12/66 370/352 |
| 8,327,026 | B1* | 12/2012 | Tripathi | H03M 7/6082 370/521 |
| 2002/0141442 | A1* | 10/2002 | Plain | H04L 29/06 370/466 |
| 2002/0150104 | A1* | 10/2002 | Hamamoto | H04L 29/12358 370/392 |
| 2003/0048794 | A1* | 3/2003 | Sato | H04W 92/04 370/401 |
| 2004/0146154 | A1 | 7/2004 | Ahimadyar et al. | |
| 2005/0091411 | A1* | 4/2005 | Michaiel | H04L 67/18 709/249 |
| 2005/0102422 | A1* | 5/2005 | Yamamote | H04L 12/1859 709/238 |
| 2005/0141482 | A1 | 6/2005 | Kleiner | |
| 2005/0141552 | A1 | 6/2005 | Schwalb | |
| 2005/0201304 | A1 | 9/2005 | Olshansky | |
| 2006/0034270 | A1* | 2/2006 | Haase | H04L 29/06027 370/389 |
| 2006/0120344 | A1* | 6/2006 | Yamaguchi | H04L 29/06027 370/351 |
| 2006/0146799 | A1* | 7/2006 | Baldwin | H04Q 11/04 370/352 |
| 2006/0168326 | A1* | 7/2006 | Baldwin | H04L 29/06027 709/238 |
| 2007/0087730 | A1* | 4/2007 | Diroo | H04L 29/06027 455/413 |
| 2007/0171898 | A1* | 7/2007 | Salva | H04L 29/06027 370/356 |
| 2007/0234416 | A1* | 10/2007 | Matsuoka | H04L 12/2803 726/12 |
| 2008/0013552 | A1* | 1/2008 | Wright | H04L 67/322 370/401 |
| 2008/0144632 | A1* | 6/2008 | Rabie | H04L 12/4604 370/395.5 |
| 2008/0200162 | A1* | 8/2008 | Chowdhury | H04L 12/1836 455/422.1 |
| 2008/0298278 | A1* | 12/2008 | Thakkar et al. | 370/260 |
| 2009/0022103 | A1* | 1/2009 | Shatsky | 370/331 |

FOREIGN PATENT DOCUMENTS

| | | |
|---|---|---|
| JP | 2-198249 | 8/1990 |
| WO | WO98/02011 | 1/1998 |
| WO | WO 2007/042620 | 4/2007 |
| WO | WO 2007/042620 A1 | 4/2007 |

OTHER PUBLICATIONS

GSM Association: "Inter-Service Provider IP Backbone Guidelines", GSM Association Official Document IR.34, Jan. 31, 2007, XP002598702, London, U.K.

Office Action issued on Jan. 30, 2012 in the corresponding Finnish Patent Application No. 20075575.

* cited by examiner

CONVERSION SYSTEM AND METHOD IN MULTIOPERATOR ENVIRONMENT

PRIORITY CLAIM

This is a U.S. national stage of application No. PCT/FI2008/050456, filed on Aug. 12, 2008. Priority is claimed on the following application: Finland Application No. 20075575 filed on Aug. 16, 2007 the content of which is incorporated herein by reference.

FIELD OF THE INVENTION

The present invention relates to communications systems, and more particularly to a method, a network element, a system, a computer program and a computer program product for providing communication conversion(s) in a multi-operator environment.

BACKGROUND OF THE INVENTION

There exist different mechanisms to convey speech between operators. The transport can be a CS—(Circuit Switched), a TDM—(Time Division Multiplexing) or an IP-based (Internet Protocol) transport. If the IP-based transport is used, the protocol can be a UDP (User Datagram Protocol), a TCP (Transmission control Protocol) protocol or an SCTP (Stream Control Transmission Protocol) protocol. For transporting video data, there exist even more possibilities. This means that in many signal traffic situations between operators at least one of the end points of a communication, or even both of the end points must carry out conversions to make the connection and the transport of a signal possible. Every conversion requires a network or terminal support, increases delays, makes a quality of the signal worse etc. Thus in an ideal situation the number of the conversions is as low as possible. Traditionally, this has been solved in such a way that the operators themselves have carried out the required conversions in their own networks.

So far this problem has not played a major role, because a traditional speech transmission has in practice been the only widely used service and the number of conversions has been quite low due to the fact that nearly all operators use TDM connections.

One of the disadvantages associated with the prior art arrangement is that when different signals and data will be used in larger scale, the traditional model will become difficult to use, because different operators use different models for conversions and thus many different options for conversions must be planned, realized, supported and stored. Furthermore, there may be no clear common agreed model to indicate which end, end point or which operator makes the conversion(s). If a first end changes its system, also a second end must update its configuration(s).

BRIEF DESCRIPTION OF THE INVENTION

An object of the present invention is thus to provide a method and an apparatus for implementing the method so as to solve the above problems. The objects of the invention are achieved by a method and an arrangement, which are characterized by what is stated in the independent claims. The preferred embodiments of the invention are disclosed in the dependent claims.

The invention is based on the idea of performing at least one conversion for the signalling and/or for the media flow from the first operator to the second operator in the network between the operators such that present network components can be utilized.

An advantage of the method and arrangement of the invention is that the operators does not have to know and take care of what kind of a network/signalling protocol/codec/ISUP (Integrated Services User Part) version the other end of the communication uses, because an IPX (Internet Packet Exchange) or a corresponding network takes care of this on behalf of the operators or other corresponding service providers like ISP (Internet Service Provider). The operator(s) is (are) thus free to use its (their) own current method(s) towards the other operator(s) in spite of its (their) requirements.

With the invention and its embodiments the operators can utilize the existing network components regardless of what kind of the end point they are communicating with, because the network between the operators automatically takes care of the mappings and conversions both for the signalling and media.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
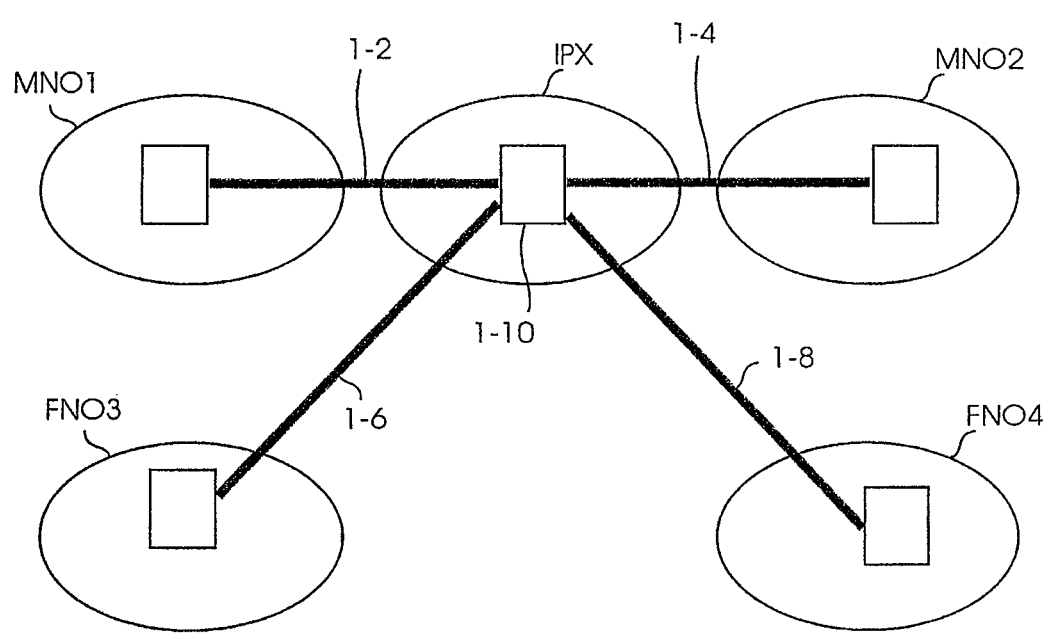
FIG. 1 is a block diagram of the invention and its embodiments.

FIG. 1 is a block diagram of the invention and its embodiments. It shows four different operators, namely two mobile operators MNO1 (MNO, Mobile Network Operator) and MNO 2 and two fixed network operators FNO3 (FNO, Fixed Network Operator) and FNO4. All or some of the operators can operate a same kind or different kind of networks and provide network services. They all can be connected together by using an IPX (Internet Packet Exchange) network being between the operators. An IPX proxy 1-10 provided for the IPX network has the ability to function as a converter or assist in conversion process between these operators according to the invention and its embodiments. The IPX proxy can adapt either the signalling or the media flow or both of them from the first operator to the requirements, features, specifications, conditions, and options of the second operator and/or a controlling element.

Each of the operators can have a different way to implement audio, voice, video and data and other kind of communications and signals. The connection 1-2 between the mobile network operator 1 MNO1 and the IPX proxy can be e.g. SIP-I, ISUP (FIN), AMR. This means that for controlling, modifying and terminating a session, a signalling protocol SIP-I is used; for setup, management and release trunk circuits that carry voice calls ISUP (Finland) signalling messages is used; and for media flow adaptive multirate speech codec is used for link adaptation to select from one of eight different bit rates based on link conditions, i.e. to adapt its operation to channel conditions. The connection 1-4 between the mobile network operator 2 MNO2 and the IPX proxy can be SIP-I, ISUP (SWE), WB-AMR. This means that for controlling, modifying and terminating a session, a signalling protocol SIP-I is used; for setup, management and release trunk circuits that carry voice calls ISUP (Sweden) signalling messages is used; and wideband adaptive multirate speech codec is used for link adaptation to select from one of eight different bit rates based on link conditions, i.e. to adapt its operation to channel conditions. The connection 1-6 between the fixed network operator 3 FNO3 and the IPX proxy can be TDM, ISUP (UK). This means that a multiplexing technique is used in which two or more signals or bit streams are transferred apparently simultaneously as subchannels in one communication channel; and for setup, management and release trunk circuits that carry voice calls ISUP (United Kingdom) signalling messages is used. The connection 1-8 between the fixed network operator 4 FNO1 and the IPX proxy can be BICC, ISUP (US), G.729. This means that bearer independent call control based on N-ISUP protocol is used as a signalling protocol for supporting narrowband ISDN (Integrated Services Digital Network) service over a broadband backbone network without interfering with interfaces to the existing network and end-to-end services; for setup, management and release trunk circuits that carry voice calls ISUP (United States) signalling messages is used; and for the coding of speech signals G.729 algorithm is used.

Although only one IPX network and one IPX proxy is shown in FIG. 1, it is possible to have more than one IPX networks, IPX proxies and converters or one or more functional blocks functioning as the IPX network, the IPX proxy or the converter. Instead of or in addition to the IPX proxy a gateway element or a server or a similar network component can be used. The converter(s) does (do) not have to be dependent on the terminal equipment or user equipment used in connection between clients of one or more operators.

The IPX proxy can comprise one or more elements for making one or more conversions according to the invention and its embodiments. It can have or be in connection with one or more databases, i.e. a collection of information or data, which can represent or map a specific target area. This database model can be based on commercial facts and/or operator-specific preferences mentioned e.g. in commercial agreements. Also the technical capabilities of the operators can be taken into consideration. In one alternative embodiment, instead of using the database model or in addition thereto, the proxy can request different data or information from different operators or end stations for conversions.

In other words, the comparison of the signalling and/or the media flow from the first operator to the requirements and features of the second operator can be made by checking the requirements and feature information from a database. There can also be an agreement between the operators, which means that there exist the agreement between the operators, i.e. no traffic is carried without some kind of inter-operator agreement being in place. This agreement normally consists of technical and commercial parts, i.e. operators agree what is the cost of traffic, what kind of services will be interconnected, what kind of network elements will be connected, what protocol will be used etc. Based on this information, operators are able to connect to each other in suitable way. If there is need for any kind of conversions and operators would like to "outsource" them into IPX, then IPX (and IPX Proxy) will need similar kind of information about each participating operator.

This information will be stored in the database that IPX carrier/IPX Proxy uses to perform conversions. I.e. in the example above database would include MNO1, MNO2, FNO3 and FNO4 and all the information listed above (such as whether MNO1 uses TDM or not, what is the required voice codec for FNO3 etc). So database as such is a database without doing something itself, but rather it is used by IPX Proxy (or similar network node) in order to perform conversions whenever needed. The database can be basically any kind of normal database (such as an Oracle database), it doesn't matter as long as IPX is able to store and fetch information using it. Information would typically be stored by IPX network carrier based on information written in inter-operator commercial agreement, which can be done for each and every operator separately.

Based on the database info IPX Proxy will perform the conversion(s), such as do a breakout conversion between CS/TDM based voice traffic and IP based voice traffic. This is similar to the already existing capabilities of various network nodes, such as IMS MGCF (Media Gateway Control Function) and MGW (Multimedia Gateway). What is important is that neither the originating nor the terminating operator needs to have those IMS nodes, but rather IPX will have them (or similar capability) build in IPX Proxy. How IPX really does that is an implementation issue, and there exist many possibilities for implementing the feature(s) and functionality (functionalities). IPX could for example purchase standard nodes (such as those IMS components) and integrate them into IPX Proxy. Other option is to have different components logically totally separated. IPX could also e.g. build necessary functions directly into the existing IPX Proxy itself without reusing any standard components such as MGW. There are really multiple options, but as long as IPX is able to perform necessary actions, it doesn't matter how each IPX does that. From the operator point of view IPX can be seen as "black box", i.e. its internal details are not necessary as such for the customers of IPX, since what is important is to "mask" any conversions needed and ensure that end-operators don't need to change anything in their own network. It is possible e.g. that the IPX Proxy will use standard interfaces to external bodies (such as those operators), but inside of IPX Proxy there is no need to standardize anything.

For one or more conversions the IPX proxy can function as described above. It can also have the ability to compare features of a first operator with the features of a second operator in a function of e.g. switching technique and/or transfer protocol and/or signalling protocol and/or ISUP variants and/or SIP variants and/or transcoding of media. The IPX proxy can comprise e.g. different sections for different functions like detection, conversion and connecting networks and operators and clients. One or more of the conversions can take place before the signalling and/or during the signalling. The conversion(s) can take place before the other end receives any communication or signalling or during the communication or signalling. The IPX proxy can have or utilize one or more databases on which bases it knows and which are the preferences of one or more or each operators or service providers connected to the proxy.

It is to be noted that FIG. 1 is for illustrative purposes. It can comprise more than four or less than four operators, more than one IPX proxy in the network or for the network, and one or more of the proxies can be divided into two or more functional blocks. The functions of the invention and its embodiments can be implemented for connecting networks of totally or partly different types or similar types and providing automatic conversions like format conversion.

The invention and its embodiments are not restricted to the number of communications systems, access networks or operators. Also, regarding the invention, the operation and structure of communications systems are described only to a degree that will assist in comprehending the invention and its embodiments. The invention and its embodiments are not specific to the particular communications system and access networks, but it will be appreciated that the present invention and its embodiments have application in many system types and may, for example, be applied in a circuit switched CS domain e.g. in GSM (Global System for Mobile Communications) digital cellular communication system, in a packet switched PS domain, e.g. in the UMTS (Universal Mobile Telecommunications System) system, and in other networks. The basic principles of the invention can be employed to enable a conversion between and/or within any (same or different) mobile and fixed network operators and (same or different) communications systems of $2^{nd}$, $2.5^{th}$, $3^{rd}$, and $4^{th}$ generation, such as GSM, GPRS (General Packet Radio Service), TETRA (Terrestrial Trunked Radio), UMTS systems and HSPA (High Speed Packet Access) systems e.g. in WCDMA (Wideband Code Division Multiple Access) technology.

The media must be comprehended as wide comprising e.g. multimedia, hypermedia, digital and analog media, speech, audio, video, data and digitized information. It can comprise different kind of messages like a short message, an instant message, an e-mail message, a multimedia message, a unified messaging message, a WAP (Wireless Application Protocol) message or an SIP (Session Initiation Protocol) message and different kind of services like voice calls, data calls, video calls, TV, wireless Internet browsing, MP3 (Moving Pictures Expert Group 1 layer 3), navigation and web broadcasting. Thus, in addition to the voice connection also the traffic type can be any other type like a videocall or an SMS (Short Message Service) depending on what kind of services are introduced or what kind of conversions the converter has to carry out.

Figure 2:
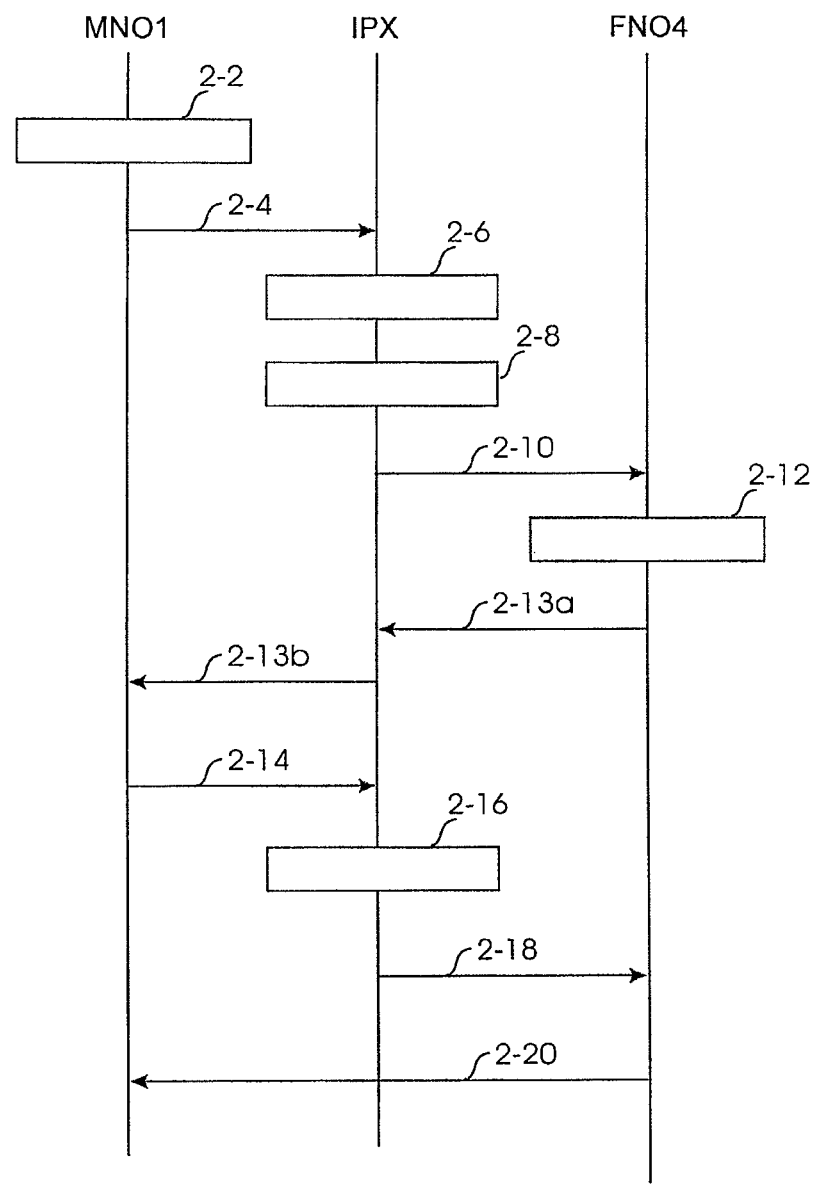
FIG. 2 is a flow chart of the invention and its embodiments.

FIG. 2 is a flow chart of the invention and its embodiments. In step 2-2 the first operator MNO1 is informed of a first client who wants to make a media flow connection, like a voice connection with a second client of the second operator FNO4. In step 2-4 MNO1 transmits signalling to IPX using SIP-I (Session Initiation Protocol) protocol and a Finnish ISUP (Integrated Services User Part) variant. Next, the IPX proxy receives the signalling and realises that it is from MNO1 and to FNO4 in step 2-6. In step 2-8 the IPX proxy can check from its database(s) and/or from another database(s) the information, features and requirement on FNO4. It can also find out that FNO4 uses e.g. BICC (Bearer Independent Call Control) signalling and an American ISUP variant. In step 2-10 the IPX proxy converts the SIP-I signalling coming from MNO1 to BICC signalling. It can also convert the Finnish ISUP variant into the American variant and transfer the signalling further to FNO4. In step 2-12 the second client in FNO4 can accept the call and the establishment of the media flow and the actual media flow begins. In steps 2-13a and 2-13b the operator FNO4 can signal the acceptance of the incoming call and other information to IPX and to MNO1, respectively. In step 2-14 the speech transfers as AMR (Adaptive Multirate Speech Codec) coded via an IP (Internet Protocol) link to the IPX proxy, which can, according to an agreement, change an AMR speech codec to G.729 (being an algorithm for the coding of speech signals) in step 2-16. In step 2-18 IPX can transfer IP packets further to FNO4. Finally, in step 2-20 a speech connection is established between the first client of the first operator MNO1 and the second client of the second operator FNO4.

There can be one or more signalling conversions and/or one or more media flow conversions independent or dependent on each other. If only media or media flow conversion (s) have to be carried out, the signalling can be the same through the network(s), from the first client to the second client. The conversion can be such that the data, signalling and media flow can be of different types of communication specifications and it will be handled to become into data of single specification type or into the specification type, what the receiving apparatus and network understands. If the connection had been established between FNO3 and MNO2, the IPX proxy would have carried out the conversion from IP speech to TDM (Time Division Multiplexing), or vice versa. If there is only a one-way connection to be established, only a single or one-way signalling and/or media flow can be processed. If there is the connection established between the first client of the first operator MNO1, MNO2, FNO3, FNO4 and the second client of the second operator MNO1, MNO2, FNO3, FNO4, the connection can be terminated on the initiative of either of the clients and/or the operators and/or one of the network components.

The described operators MNO1, MNO2, FNO3, FNO4 can be totally or partly of different types in respect of signalling specifications. They can also be of the same type, if conversion(s) is (are) anyway required or wanted or carried out. Also the signalling and the media flow from the first operator to the second operator and from the second operator to the first operator can be of same or different types and specifications.

The converter element can have different capabilities. It can e.g. make conversions or changes between circuit switched and packet switched techniques like between PSTN (Public Switched Telephone Network) and VoIP (Voice over Internet Protocol); SS7 (Signalling System #7) and SIGTRAN (IETF, Internet Engineering Task Force, Signalling Transmission); and break-out and break-in, which can be defined to be a service providing a gateway function between two different client groups like the public telephone group and a business group.

It can make conversions or needed changes between transport protocols like TCP (Transmission control Protocol) protocol and SCTP (Signalling Common Transport Protocol); and signalling protocols like BICC (Bearer Independent Call Control) and SIP-I (Session Initiation Protocol) and SIP and H.323 (being an ITU-T, Telecommunications Standardization Sector, standard for real-time multimedia communications for packet-based networks). In addition it can make conversions between different ISUP variants like ISUP UK (United Kingdom) and ISUP GER (Germany); and between different SIP variants like IETF (the Internet Engineering Task Force) SIP and 3GPP ($3^{rd}$ Generation Partnership Project) SIP. Also the media can be transcoded e.g. between AMR and G.711 (being an algorithm for transmitting and receiving pulse code modulated voice signals) voice codec.

It is also possible to make more than one conversion simultaneously and receive and make conversions from more than one source.

In one alternative implementation of the invention and its embodiments the converter can make a request (as usual), like a DNS/ENUM (Domain Name System/Enumeration) request, instead of its own database to the other end point of the communication and based on the request decide whether to forward the traffic as the circuit switched type or packet type to the traffic receiving operator. In other words, if no reply is found in ENUM, a breakout is proceeded to the circuit switched side. This alternative can be implemented e.g. for the voice traffic.

In another alternative other corresponding network or network element(s) can be utilized than the IPX proxy. In addition to the IPX proxy also the operators own system(s) can be used for making the change(s) and conversion(s) of a certain level, and other changes can be made by the IPX proxy.

A computer program comprising program code means adapted to perform any necessary steps, when the program is run on a processor can implement the invention and its embodiments. It also is possible to have a computer program product comprising program code means stored in a computer readable medium, the program code means being adapted to perform any of said steps, when the program is run on a computer or on a processor.

All modifications and configurations required for implementing functionality of the invention and its embodiments may be performed as routines, which may be implemented as added or updated software routines, application circuits ASIC and/or programmable circuits. Software routines, also called program products, including applets and macros, can be stored in any apparatus-readable data storage medium and they include program instructions to perform particular tasks. Software routines may be downloaded into an apparatus. The apparatus, such as converters or controllers, or corresponding server or proxy components, or a user terminal may be configured as a computer including at least a memory for providing storage area used for arithmetic operation and an operation processor for executing the arithmetic operation. An example of the operation processor includes a central processing unit. The memory may be removable memory detachably connected to the apparatus.

The invention and its embodiments can be applied in environment where there exist mobile operators, fixed network operators and other companies using PSTN networks and IP-based networks and services. The object is to ensure that the operators themselves do not have to take care of where conversion(s) like between PSTN/CS side and IP side are made. Instead this is handled automatically by the network(s) between the operators.

The invention and its embodiments can be applied to situations where one or more of the following conversions between the operators or other service providers are made for different kind of media: The transfer can be CS/TDM/PSTN based or IP based; the transfer protocol can be TCP or SCTP; the ISUP version can be any of the about 200 national or international versions; the speech codec can be any version of speech codecs like AMR or some of its subformats or G.711; for IP based speech data the signalling protocol can vary e.g. between H.323 and SIP or one off its subprofiles.

The invention and its embodiments can also be applied in Internetworking processes, which involve connecting two or more networks or network segments together to form an internetwork. In it the devices operate at the OSI (Open System Interconnection) layer 3. Also IP internetworking can be used being a process by which the IP traffic can be transported across e.g. a WAN (Wide Area Network) networks providing connectivity for geographically distributed hosts or LAN (Local Area Network) networks.

As written above, the media can be whatever media. For transferring e.g. video information there exist many or even more possibilities than for transferring voice or speech. This means that in traffic between the operators at least one end operator or both ends must make changes or conversions for making the connection even possible. By the invention and its embodiments costs can be reduced, delays can be reduced or even eliminated and the quality can become better. Also the amount of terminal and device support can be minimized.

The invention and its embodiments can also be applied to traffic from the operator to the same operator, if change(s) or conversion(s) are needed.

The invention and its embodiments are usable in many situations, e.g. where there exist many operators each or many having own conversion option, because now many different options for conversions can be avoided. There can now also be provided a common model to agree, which end makes the needed conversion(s). Furthermore, if one end alters its system, the other end does not have to update its configuration. There is also no need for the operator to have a database or a list with all possible changes required for the other end. The invention and its embodiments can be applied to present operators without any updating or without processing capabilities of the operators for conversions. This reduces the acquisition costs and costs for maintenance of the operators. Also costs for usage can be reduced, because the other end previously making the conversions, do not anymore do the conversions charging the other end for these conversion. Also the agreements for couplings can be made simpler, because the network between the operators can agree technical details for conversions.

A major advantage of the method and arrangement of the invention is that the operators does not have to know and take care of what kind of a network/signalling protocol/codec/ISUP (Integrated Services User Part) version the other end uses, because the IPX (Internet Packet Exchange) network takes care of this on behalf of the operator. The operator is thus free to use their own method towards the other operators in spite of what they want. This brings both technical advantages, like less hardware and components, and agreement level advantages, like making the agreement between the operators easily.

It is also possible to control the traffic and its route between e.g. GRX/IPX (General Packet Radio Service Roaming Exchange) and PSTN in a function of cost. Thus the most cost-effective route can be found and/or recommended and/or used.

Since the conversion component(s) can be seen as a black box, the system is fully transparent in view of e.g. IMS (Internet Protocol Multimedia Subsystem) and no standardization or vendor support is needed for the invention.

It will be obvious to a person skilled in the art that, as the technology advances, the inventive concept can be implemented in various ways. The invention and its embodiments are not limited to the examples described above but may vary within the scope of the claims.

The invention claimed is:

1. A method of performing signaling and media conversion in a multioperator environment, the environment comprising at least a first network of a first network operator, a second network of a second network operator, and an Internet Packet Exchange (IPX) proxy, the method comprising:

receiving in the IPX proxy, from a first client connected to the first network, a signaling message requesting a media flow establishment to a second client connected to the second network;

detecting, by the IPX proxy, that the signaling message is targeted to the second network;

fetching, by the IPX proxy, signaling and media flow specification information of the second network from a database of the second network, the specification information comprising one or more features;

sending, by the IPX proxy, a request for additional feature information to the second network or to the second client in the second network;

receiving the requested feature information;
  carrying out, by the IPX proxy, at least one conversion to the received signaling message using the fetched and received signaling features of the second network so that the signaling message after conversion is according to the signaling features of the second network;
  transmitting, after the at least one conversion, the signaling message from the IPX proxy to the second network;
  receiving in the IPX proxy from the second network an acceptance (2-12) of the second client to establish the media flow between the first client and the second client;
  transmitting the acceptance from the IPX proxy to the first network;
  receiving in the proxy the media flow from the first network;
  comparing, by the IPX proxy, features of the media flow with corresponding media flow features of the second network;
  if one or more features of the media flow are different from one or more corresponding media flow features of the second network, carrying out, by the IPX proxy, at least one conversion to the received media flow on the basis of the different one or more features so that the media flow after conversion is according to the media flow features of the second network;
  transferring the media flow from the proxy to the second network; and
  establishing, after transferring the media flow to the second network, the connection between the first client and the second client, wherein the conversions are transparent to the first network, the second network, the first client and the second client;
  Wherein the conversions can include one or more signaling and one or more media flow dependent on each other;
  Wherein the conversions can include one or more signaling and one or more media flow independent on each other; and
  Wherein the conversion can be such that the data, signaling and media flow can be of different types of communication specifications.

2. A method according to claim 1, wherein the conversion is between a circuit switched signal and a packet switched signal;
  between a PSTN (Public Switched Telephone Network) signal and a VoIP (Voice over Internet Protocol) signal; or between an IP (Internet Protocol) signal and a TDM (Time Division Multiplex) signal; or
  between a SS7 (Signaling System #7) signal and SIGTRAN (IETF, Internet Engineering Task Force, Signaling Transmission) signal; or between a break-out signal and a break-in signal; or transport protocols;
  between a TCP (Transmission control Protocol) protocol and a SCTP (Signaling Common Transport Protocol) protocol; or signaling protocols;
  between a BICC (Bearer Independent Call Control) protocol and SIP-I (Session Initiation Protocol) protocol; or
  between a SIP protocol and H.323 (ITU-T, Telecommunications Standardization Sector, standard for real-time multimedia communications for packet-based networks) protocol; or
  different ISUP variants between ISUP of a first country and ISUP of a second country; or
  different SIP variants between IETF (the Internet Engineering Task Force) SIP variant and 3GPP (3rd Generation Partnership Project) SIP variant; or
  different media transcoding between AMR transcoding and G.711 (algorithm for transmitting and receiving pulse code modulated voice signals) voice codec coding.

3. A network element (IPX, 1-10) for performing signaling and media conversion in a multioperator environment, the environment comprising at least a first network of a first network operator, a second network of a second network operator, and
  the network element, the network element (IPX, 1-10) being configured to:
    receive from a first client connected to the first network a signaling message requesting a media flow establishment to a second client connected to the second network;
    detect that the signaling message is targeted to the second network;
    fetch signaling and media flow specification information of the second network from a database of the second network;
    send a request for additional feature information to the second network or to the second client in the second network;
    receive requested feature information;
    carry out at least one conversion to the received signaling message using the fetched and received signaling features of the second network so that the signaling message after conversion is according to the signaling features of the second network;
    transmit after the at least one conversion the signaling message from the network element to the second network;
    receive from the second network an acceptance (2-12) of the second client to establish the media flow between the first client and the second;
    transmit the acceptance to the first network;
    receive the media flow from the first network;
    compare features of the media flow with corresponding media flow features of the second network;
  if one or more features of the media flow are different from one or more corresponding media flow features of the second network, carry out at least one conversion to the received
  media flow on the basis of the different one or more features so that the media flow after conversion is according to the media flow features of the second network;
    transfer the media flow to the second network; and
    establish the connection between the first client and the second client, wherein the conversions are transparent to the first network, the second network, the first client and the second client;
    Wherein the conversions can include one or more signaling and one or more media flow dependent on each other;
    Wherein the conversions can include one or more signaling and one or more media flow independent on each other; and
  Wherein the conversion can be such that the data, signaling and media flow can be of different types of communication specifications.

4. A network element (IPX, 1-10) according to claim 3, wherein the conversion is between a circuit switched signal and a packet switched signal;

between a PSTN (Public Switched Telephone Network) signal and a VoIP (Voice over Internet Protocol) signal; or between an IP (Internet Protocol) signal and a TDM (Time Division Multiplex) signal; or between a SS7 (Signaling System #7) signal and SIGTRAN (IETF, Internet Engineering Task Force, Signaling Transmission) signal; or between a break-out signal and a break-in signal; or transport protocols;

between a TCP (Transmission control Protocol) protocol and a SCTP (Signaling Common Transport Protocol) protocol; or signaling protocols;

between a BICC (Bearer Independent Call Control) protocol and SIP-I (Session Initiation Protocol) protocol; or between a SIP protocol and H.323 (ITU-T, Telecommunications Standardization Sector, standard for real-time multimedia communications for packet-based networks) protocol; or different ISUP variants between ISUP of a first country and ISUP of a second country; or different SIP variants between IETF (the Internet Engineering Task Force) SIP variant and 3GPP (3rd Generation Partnership Project) SIP variant; or different media transcoding between AMR transcoding and G.711 (algorithm for transmitting and receiving pulse code modulated voice signals) voice codec coding.

5. A system of performing signaling and media conversion in a multioperator environment, comprising a first network of a first network operator to which a first client is connected;

a second network of a second network operator to which a second client is connected;

and a network element (1-10) according to claim 3 connecting the first network and the second network, wherein the first network and the second network use different signaling and/or media flow format(s).

6. A non-transitory computer-readable medium storing a computer program comprising program instructions, wherein execution of said program instructions causes a device containing the computer program to perform the steps of claim 1.

\* \* \* \* \*